United States Patent [19]

Uehara et al.

[11] Patent Number: 4,595,946
[45] Date of Patent: Jun. 17, 1986

[54] WHITE BALANCE CONTROL SYSTEM INCLUDING A FLUORESCENT LIGHT RIPPLE DETECTOR

[75] Inventors: Masao Uehara; Shunpei Tanaka, both of Hachioji, Japan

[73] Assignee: Olympus Optical Company Ltd., Japan

[21] Appl. No.: 575,344

[22] Filed: Jan. 31, 1984

[30] Foreign Application Priority Data

Feb. 2, 1983 [JP] Japan .................................. 58-15687
Oct. 14, 1983 [JP] Japan ................................ 58-192234

[51] Int. Cl.$^4$ ............................................. H04N 9/73
[52] U.S. Cl. .................................................... 358/29
[58] Field of Search ........................................ 358/29

[56] References Cited

U.S. PATENT DOCUMENTS

Re. 28,774 4/1976 Kubota et al. .......................... 358/29
4,499,487 2/1985 Takayama et al. .................... 358/29
4,524,381 6/1985 Konishi ................................. 358/29

FOREIGN PATENT DOCUMENTS 127376 8/1982 Japan .

Primary Examiner—John W. Shepperd
Attorney, Agent, or Firm—Ostrolenk, Faber, Gerb & Soffen

[57] ABSTRACT

A white balance control system comprises a ripple detecting circuit for detecting a ripple component associated with a fluorescent lamp source or the like which is contained in light from an object being photographed. Alternatively a circuit may be provided for detecting a particular color temperature from color temperature information which is used in a white balance control. A white balance adjusting circuit responds to an output from either the ripple detecting circuit or the detecting circuits to provide a correction for any offset in the white balance control.

14 Claims, 5 Drawing Figures

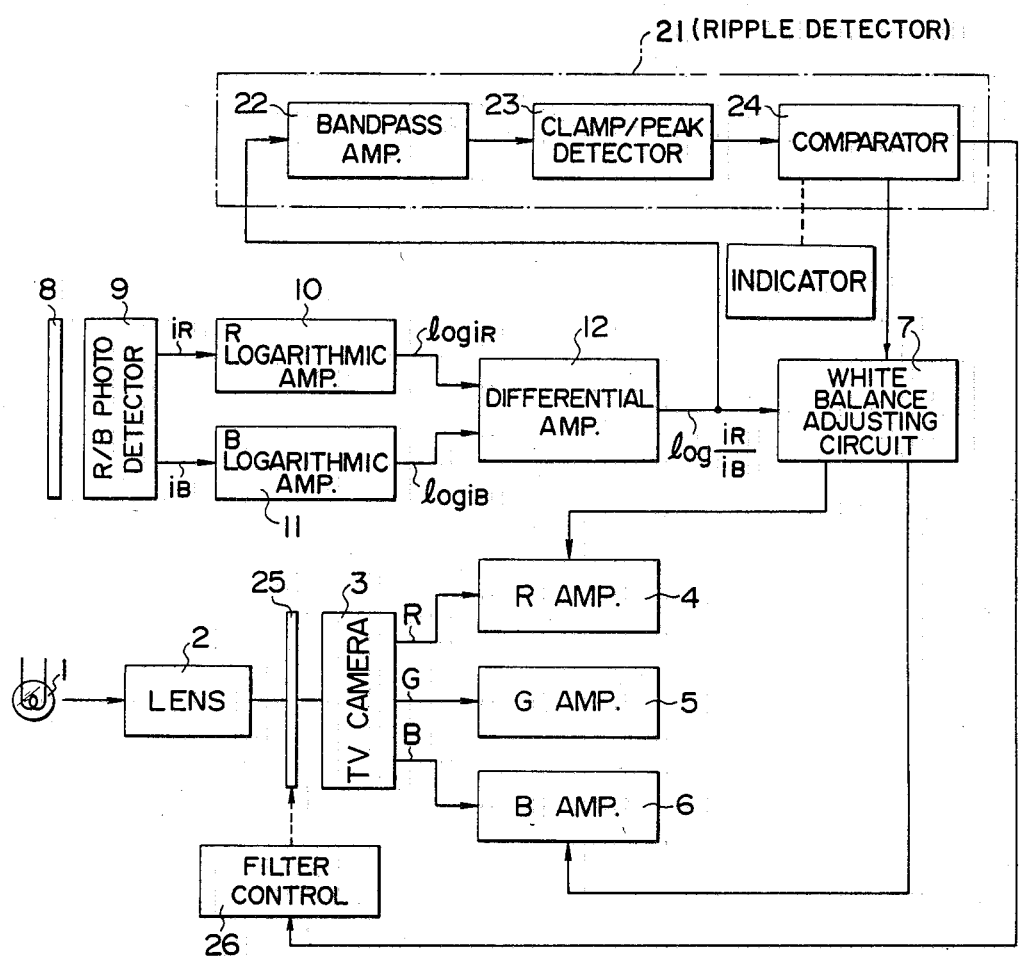

WHITE BALANCE CONTROL SYSTEM INCLUDING A FLUORESCENT LIGHT RIPPLE DETECTOR

BACKGROUND OF THE INVENTION

The present invention relates to a white balance control system, and more particularly, to a system which provides an automatic correction of a color temperature in a color video camera.

In a color video camera, an adjustment of a white balance is required in order to produce a color picture of a high quality. If the color temperature of a light source changes, a corresponding change occurs in the white balance. Accordingly, in addition to the provision of a television camera tube or camera element, it has been proposed to provide a sensor in connection with the correction of the color temperature of a color video camera which determines the color temperature of a light source associated with an object being imaged. A white balance control system is provided which utilizes an output from a sensor in an arithmetic operation to adjust the white balance automatically.

FIG. 1 is a block diagram of a conventional white balance control system. Light emitted from a light source 1 (more generally an object being imaged) passes through the optical lens 2 of a color video camera to be imaged on a camera element 3. The camera element 3 produces three electrical signals for the red (R), green (G) and blue (B), respectively, which signals are amplified by an R signal amplifier 4, a G signal amplifier 5 and a B signal amplifier 6, respectively. In the arrangement shown, the amplification degree of the amplifiers 4, 5 and 6 is controlled by a white balance adjusting circuit 7. An R/B photodetector 9 formed by a light receiving element having a color filter of a spectral response which is identical to that of the camera element 3 is located so as to receive light from the light source 1 (an object being photographed), with an opal diffuser plate 8 being disposed in front of the detector 9. Various colored lights from an ordinary scene, when added together, infinitely approach the white, and accordingly, the purpose of the opal diffuser plate 8 is to diffuse reflected light from an object being photographed to form an additive sum of light transmitting therethrough over the entire surface of the diffuser plate 8.

R and B signals from the photodetector 9 which are converted into photocurrents $i_R$, respectively, $i_B$, are fed to logarithmic amplifiers 10, 11, respectively, which produce out-put signals log $i_R$, log $i_B$. Outputs from the logarithmic amplifiers 10, 11 are fed to a differential amplifier 12 which produces an output signal equal to log $i_R$ − log $i_B$ = log $(i_R/i_B)$ which is then fed to the white balance adjusting circuit 7. The output signal log $(i_R/i_B)$ changes solely in accordance with a change in the color temperature of the light source 1, independently of the amount of light which is incident upon the photodetector 9, and hence the white balance adjusting circuit 7 controls the amplification degree of the R and the B signal amplifier 4, 6 in a direction to achieve a proper white balance. Specifically, if an object being photographed is a white paper, it is required that outputs from the color video camera maintain a faithful reproduction of the white when amplified by the amplifiers 4 to 6. To this end, the adjusting circuit 7 operates to change the amplification degree of the amplifiers 4 and 6 in accordance with the output signal log $(i_R/i_B)$ from the differential amplifier 12, thus achieving a mixing of the signal levels of R and B, which are two of three primary colors R, G and B, at a proper proportion, which is a white balance control.

By utilizing the white balance control system mentioned above, a proper white balance can be maintained by detecting the R and B components of light from an object being photographed which is under illumination of sunlight or radiation from a tungsten lamp which can be approximated by the spectrum of radiation from a black body by means of the R/B photodetector 9, in a similar manner as by the television camera element 3. However, where the light source comprises a fluorescent lamp or the like, such source exhibits a peculiar spectrum which is distinct from that of the radiation from the black body, so that when a color video camera is used including circuitry of the type which controls the gain over R and B signals in response to the detection of R and B components of incident light, an offset in the adjustment of the white balance is caused, preventing the maintenance of a good white balance from being achieved.

To cope with this problem, there has been proposed a white balance control system (see Japanese Laid-Open Patent Application No. 127,376/1982) including a sensor capable of detecting the spectra of three primary colors R, G and B and also including another sensor which is capable of detecting a distinct spectrum. However, this circuit arrangement requires the provision of a plurality of sensors since there are a variety of types of fluorescent lamp sources. If it is desired to cover every kind of lamp source, an increased number of sensors must be used, resulting in a complex circuit arrangement and an increased cost.

A human eye is capable of sensing a flickering in the radiation from a fluorescent lamp source, but a light sensitive element can detect such flickering in a more accurate manner. The flickering produced by a fluorescent lamp source has a period which is equal to the reciprocal of twice the frequency of a commercial power supply. It has been experimentally determined that the timing or phase of the emission differs between the three primary colors R, G and B. On the other hand, natural light or sunlight has no flickering, and a tungsten lamp exhibits a flickering which while having the same frequency has a substantially reduced magnitude as compared with that of a fluorescent lamp since the thermal time constant of the filament of the tungsten lamp has an increased value. Accordingly, a discrimination between a fluorescent lamp source and other light sources can be made by noting the magnitude of a specific frequency flickering from the source used (such flicker represents a ripple electrically, and hence will be hereafter referred to as a "ripple").

SUMMARY OF THE INVENTION

In view of the foregoing, it is an object of the invention to provide a white balance control system including ripple detecting means which is capable of detecting the use of a fluorescent lamp as a light source and which produces an output which is used to control white balance adjusting means.

It is another object of the invention to provide a white balance control system having an inexpensive arrangement and accommodating for any one of a plurality of various fluorescent lamp sources while affording a white balance control of a higher accuracy.

It is a further object of the invention to provide a white balance control system which causes a color temperature conversion filter, which converts the color temperature of an object being photographed into a lower color temperature, to be taken out of a taking light path when a fluorescent lamp source is used.

According to the invention, there is provided ripple detecting means which detects a ripple component or components produced by a fluorescent lamp source. The detecting means is effective to correct for any offset produced in the white balance control caused by the fluorescent lamp source. In this manner, a proper white balance is maintained with a simple and inexpensive circuit arrangement, without employing a plurality of sensors as in the prior art.

The ripple detecting means detects whether or not the light source used comprises a fluorescent lamp, and also determines whether the light source used has a specific color temperature. Accordingly, when a light source comprises a specific fluorescent lamp source, any offset caused in the white balance control due to this specific lamp source can be corrected, thus assuring a proper white balance.

In addition, when the light source comprises a fluorescent lamp, a color temperature conversion filter which is usually disposed in the taking light path is caused to move out of the light path or a corresponding warning is produced, thus permitting adverse influences by the color temperature conversion filter to be removed.

BRIEF DESCRIPTION OF THE DRAWINGS

FIG. 2 is a block diagram of a white balance control system according to one embodiment of the invention;

DESCRIPTION OF PREFERRED EMBODIMENTS

Figure 1:
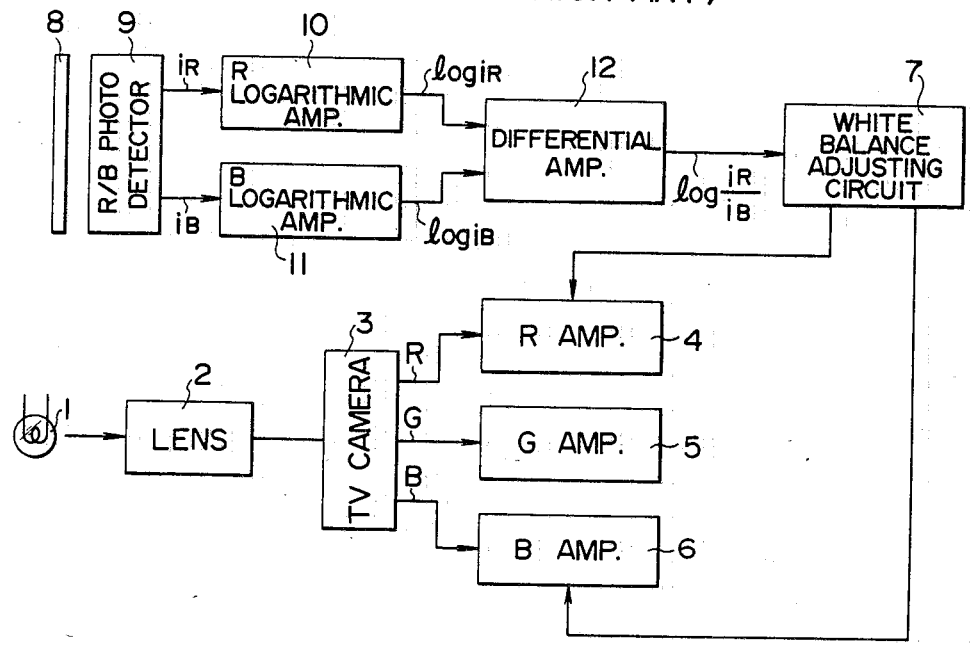
FIG. 1 is a block diagram of an exemplary white balance control system of the prior art.

Referring to FIG. 2, there is shown a block diagram of a white balance control system according to one embodiment of the present invention. It is to be understood that similar parts as those shown in FIG. 1 are designated by like reference characters as before, and their description will not be repeated. In the embodiment shown, an output from a differential amplifier 12, which is the same as the differential amplifier 12 shown in FIG. 1, is applied to a ripple detector circuit 21, in addition to a white balance adjusting circuit 7. The ripple detector circuit 21 comprises a bandpass amplifier which selectively amplifies and outputs a ripple component contained in the output signal log $(i_R/i_B)$ from the differential amplifier 12 which has a period corresponding to twice the frequency f of a commercial power supply. The detector circuit 21 also comprises a clamp/peak detector circuit 23 which converts a ripple output from the amplifier 22 into a d.c. voltage having a magnitude which corresponds to the amplitude of the ripple component, and a comparator 24 which compares the level of the d.c. output voltage from the detector circuit 23 to produce a decision output of either "1" or "0". The decision output from the comparator 24 is applied to the adjusting circuit 7, which operates to correct for any offset in a white balance whenever the output is equal to "1".

It is also recognized that when the color temperature of an object being photographed increases, the dynamic range of the television camera element 3 is exceeded to upset the balance of color signals. Accordingly, for color temperatures above 5,000° to 6,000° K., the color temperature is converted to a lower value by interposing a color temperature conversion filter 25, which is commonly referred to as A-type filter, between the optical lens 2 and the camera element 3. It should be noted that such conversion filter 25 is effective when it is used with sunbeam or normal light sources having a high color temperature. However, for a light source having a peculiar spectrum such as fluorescent lamp, the use of such conversion filter 25 is known to present difficulty in achieving a proper white balance. Accordingly, in the control system of the present invention, the conversion filter 25 is associated with a filter control circuit 26 which is operated in response to an output from the comparator 24.

Figure 3:
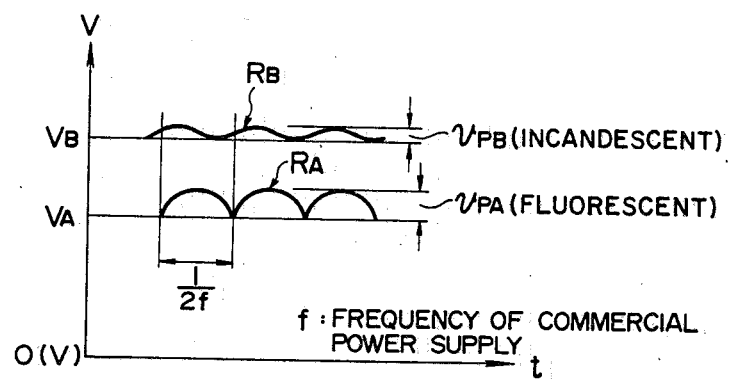
FIG. 3 graphically shows ripples which are treated by a clamp/peak detector circuit shown in FIG. 2.

In operation, the output signal log $(i_R/i_B)$ from the differential amplifier 12 is applied to the white balance adjusting circuit 7, which in turn controls the degree of amplification of the R signal and the B signal amplifier 4, 6 in order to achieve a proper white balance on the basis of the output which changes with a change in the color temperature of the light source 1. The output from the amplifier 12 is also applied to the bandpass amplifier 22 within the ripple detector circuit 21, and only the ripple component (i.e., a component having a frequency equal to twice that of the commercial power supply) contained in the output signal log $(i_R/i_B)$ is amplified and output from the amplifier 22. The ripple component log $i_R/i_B$ associated with a light source which is contained in light from an object being photographed is illustrated in FIG. 3. By way of example, FIG. 3 shows a ripple component $R_A$ for a fluorescent lamp source, and a ripple component $R_B$ for a tungsten lamp. As previously mentioned, this ripple is a result of the phase difference between the two colors. It will be apparent from FIG. 3 that the ripple component $R_A$ or $R_B$ is superimposed on a d.c. voltage $V_A$ or $V_B$, and the amplified ripple component is applied to the clamp/peak detector circuit 23, which operates to clamp the base of the ripple component $R_A$ or $R_B$ to zero volts and effects a peak detection, whereby a d.c. voltage corresponding to a peak value $v_{PA}$ or $v_{PB}$ is derived. This d.c. voltage has a sufficient magnitude to allow a distinction between the ripple component $R_A$ from the fluorescent lamp source and the ripple component $R_B$ from other light sources, and hence when the d.c. output voltage from the detector circuit 23 is fed to the comparator 24, the latter is capable of producing an output of "1" for a d.c. output voltage corresponding to the ripple component $R_A$ from the fluorescent lamp source and to produce an output of "0" for a d.c. output voltage corresponding to the ripple component $R_B$ from other light sources.

When the output signal of "1" from the comparator 24 is generated, the white balance adjusting circuit 7 operates to correct for an offset in a white balance. Specifically, when the R/B photodetector 9 detects light from a fluorescent lamp source which produces a peculiar spectrum, the differential amplifier 12 may produce an output which may cause the adjusting circuit 7 to perform an imperfect operation to maintain a proper white balance, thus resulting in an offset in the white balance. This in turn causes a picture of an object being photographed to be reproduced in a color which is more bluish or reddish in tone than the actual color. However, when the output from the comparator 24 is applied to the adjusting circuit 7, the latter corrects for an offset in the white balance control, thus bringing the color tone of the picture of the object being photographed to one which is closer to the actual color tone. A variety of fluorescent lamps are generally of a white or a daylight color tone, and recently fluorescent lamps are becomming popular which produce three primary colors of a high color rendition. While these lamps produce individually specific emissions, they can often be generally regarded as exhibiting an offset in a regular trend, by a suitable choice of the spectral response of the photodetector 9. Thus, when the use of a fluorescent lamp is detected by the detector circuit 21, an output therefrom may be used to cause the white balance adjusting circuit 7 to change the level of the R and B signals in accordance with the magnitude of the offset, thus maintaining a substantially correct white balance.

When the detector circuit 21 detects the ripple component $R_A$ from the fluorescent lamp source and the comparator 24 produces an output of "1", this output is also applied to the filter control circuit 26 to activate it. Hence, if the color temperature conversion filter 25 is interposed between the optical lens 2 and the camera element 3 and radiation from a fluorescent lamp source is contained in light reflected from an object being photographed, the control circuit 26, which also includes a control mechanism, operates to drive the filter 25 out of the taking light path. This assures a proper white balance adjusting and correcting operation by the adjusting circuit 7.

It is to be noted that radiation from a fluorescent lamp has a color temperature which is inherent to the kind of a particular fluorescent lamp. Accordingly, it may be desirable to apply a correction to the white balance control only for a particular type fluorescent lamp source or sources, rather than applying a uniform correction for fluorescent lamp sources of every kind. An embodiment which is suitable for use in such instance will now be described with reference to FIG. 4.

Figure 4:
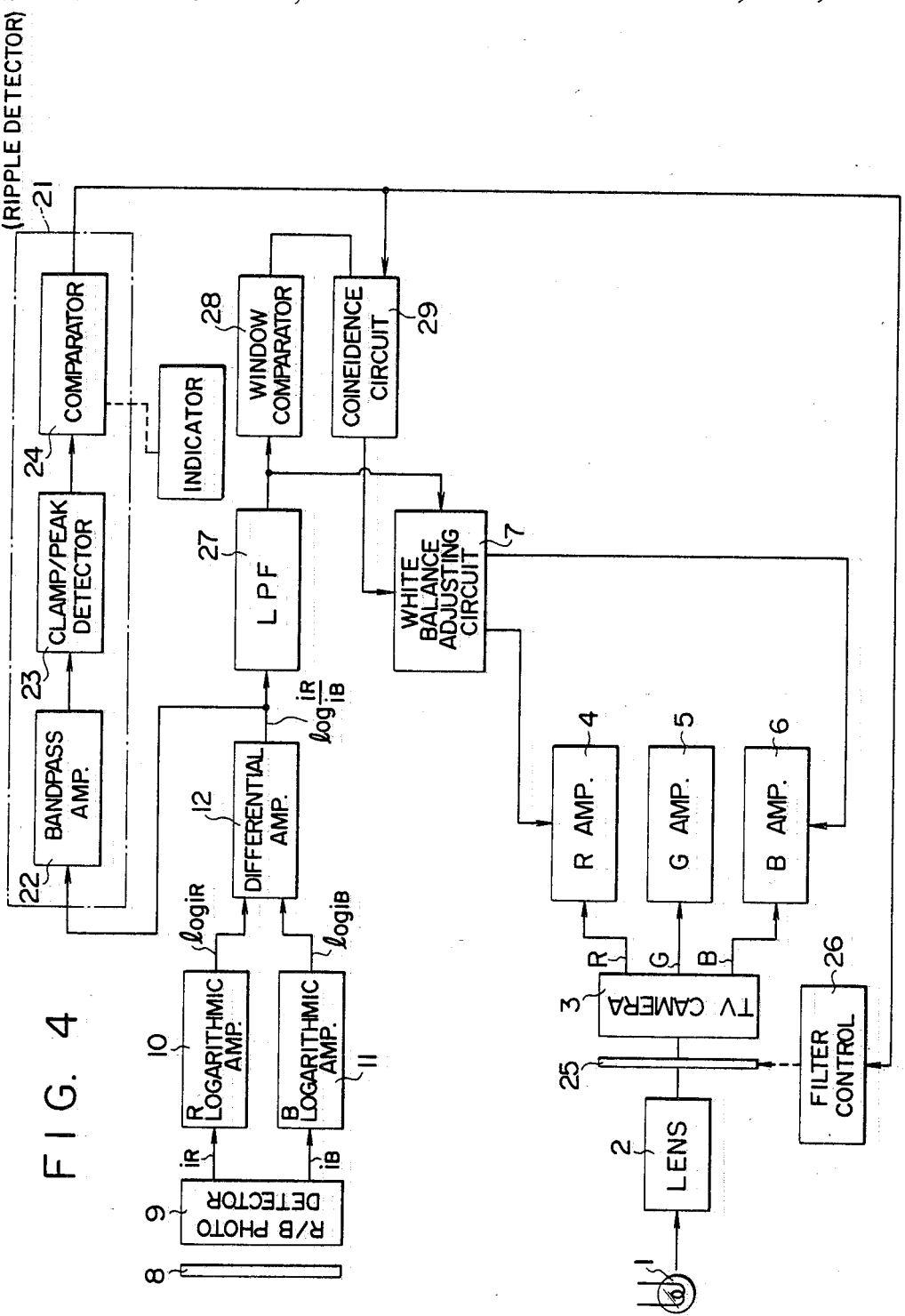
FIG. 4 is a block diagram of a white balance control system according to another embodiment of the invention.

FIG. 4 is a block diagram of a white balance control system according to another embodiment of the invention. In this Figure, parts corresponding to those shown in FIGS. 1 and 2 are designated by like reference characters as used in FIGS. 1 and 2, and will not be described again. This embodiment also includes a ripple detector circuit 21 which is constructed in the same manner as shown in FIG. 2. An output from a differential amplifier 2 is applied to the ripple detector circuit 21, and a decision output from the comparator 24 of the detector circuit 21 is supplied to one input of a coincidence circuit 29.

The output signal log $(i_R/i_B)$ from the differential amplifier 12 is passed through a low pass filter (LPF) 27 which is effective to remove ripple components contained therein. A d.c. voltage from the filter 27 is applied to a white balance adjusting circuit 7 to enable an adjusting operation thereof.

The output from the filter 27 is also fed to a window comparator 28, which determines if the output from the filter 27 is within a range of voltages which correspond to a particular range of color temperatures, to provide a decision output of "1" or "0". The decision output from the comparator 28 is supplied to the other input of the coincidence circuit 29. An output from the coincidence circuit 29 is fed to the adjusting circuit 7 so that the latter is capable of correcting any offset in the white balance control whenever the output from the coincidence circuit 29 is equal to "1".

A filter control circuit 26 is supplied with an output from the comparator 24 so as to control the color temperature conversion filter 25 in the manner described above.

In operation, the output signal log $(i_R/i_B)$ from the differential amplifier 12 is passed through the low pass filter 27, and its output, which is free from ripple components, is supplied to the white balance adjusting circuit 7. Accordingly, as the output signal log $(i_R/i_B)$ changes with a change in the color temperature of the light source 1 (see FIG. 5), the white balance adjusting circuit 7 controls the degree of amplification of the R signal and the B signal amplifier 4, 6 in accordance with such output so as to achieve a proper white balance. The output from the differential amplifier 12 is also fed to the ripple detector circuit 21, which operates in the similar manner as mentioned above in connection with FIG. 2 to provide a peak value $v_{PA}$ from the clamp-/peak detector circuit 23 for the ripple component $R_A$ associated with a fluorescent lamp source which is sufficiently higher than a peak value $v_{PB}$ (see FIG. 3) for the ripple component $R_B$ associated with other light sources, enabling the comparator 24 to produce an output of "1" for the fluorescent lamp source and an output of "0" otherwise.

Figure 5:
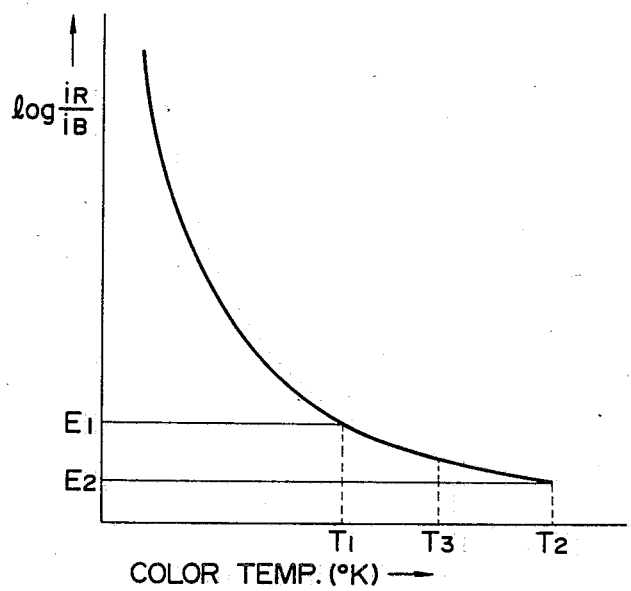
FIG. 5 graphically shows a change in an output from a differential amplifier plotted against a change in the color temperature.

After being passed through the low pass filter 27, the voltage log $(i_R/i_B)$ representing the color temperature which is derived from the differential amplifier 12 is also fed to the window comparator 28. The purpose of the window comparator is to detect the color temperature $T_3$ (°K.) of a particular fluorescent lamp (as shown in FIG. 5) based on the recognition that each type of fluorescent lamp has its inherent color temperature. In general, the color temperature of a fluorescent lamp source varies with the response of the fluoresent lamp itself, a contamination of associated accessories such as reflector as well as the condition of an object being photographed. Accordingly, the purpose of the window comparator 28 is to detect the color temperature of such particular fluorescent lamp if the voltage log $(i_R/i_B)$ is within a range from $E_1$ to $E_2$ corresponding to a range of temperatures $T_1$ to $T_2$ centered about the particular color temperature $T_3$ (°K.), thereby producing an output of "1" within such range and an output of "0" otherwise.

It will be seen therefore that when a fluorescent lamp is used as a light source for the color video camera, the ripple detector circuit 21 produces an output of "1", and if the fluorescent lamp source exhibits a particular color temperature which is preselected by the window comparator 28, the latter produces an output of "1". The coincidence circuit 29 then produces an output of "1". When the output signal of "1" from the coincidence circuit 29 is applied to the adjusting circuit 7, the latter operates to provide a correction for any offset in the white balance control. Thus any imperfect white balance controlling operation by the adjusting circuit 7 and hence any offset in the white balance which may be caused by an output from the differential amplifier 12 whenever the R/B photodetector 9 detects light output from a particular fluorescent lamp source exhibiting a specific color temperature can be corrected for by changing the level of the R and B signals in accordance with the magnitude of such offset, thus maintaining a substantially proper white balance.

If the light source used comprises a fluorescent lamp and the ripple detector circuit 21 produces an output of "1", the window comparator 28 will nevertheless produces an output of "0" when this fluorescent lamp is not the particular fluorescent lamp for which the comparator 28 is designed, whereby the coincidence circuit produces an output of "0", preventing a correction of offset in the white balance control.

Considering varieties of fluorescent lamps, fluorescent lamps which are currently in use can be categorized into white type, daylight type and high color rendition type. While the emissions from these lamps are distinct from each other, fluorescent lamps of the white and the high color rendition type exhibit color temperatures in a range from 5,000° to 6,000° K. while fluorescent lamps of daylight type exhibit a higher color temperature in a range from 8,000° to 10,000° K. Accordingly, by arranging for the window comparator 28 to detect a range of voltages log ($i_R/i_B$) output from the differential amplifier 12, which occur for a range of color temperatures from 8,000° to 10,000° K. (see FIG. 5), the coincidence circuit 29 is allowed to produce an output of "1" when a fluorescent lamp of daylight type is used, thereby allowing a correction for any offset in the white balance control by the adjusting circuit 7. In this manner, a proper white balance control is assured. Recently, a diffuser panel 8 has been developed which is effective to achieve an additive or integrating action to convert light output from a fluorescent lamp source of white type to light which is closely similar to natural light or light output from a tungsten lamp or the like. In such instance, it may be unnecessary to provide a correction for any offset in the white balance control when a fluorescent lamp source of the white type is used. Thus when using fluorescent lamp sources other than a particular fluorescent lamp of daylight type, the white balance control is performed in response to an output signal from the differential amplifier 12 which is fed through the low pass filter 27 to the adjusting circuit 7, in a similar manner as effected when a tungsten lamp source is used.

It is expected that the kinds of fluorescent lamps will increase further in future, and the invention allows a correction for any offset in the white balance control by the adjusting circuit 7, by arranging the window comparator 28 to detect a particular fluorescent lamp source or a particular group of fluorescent lamp sources, based on differences in the color temperature of various fluorescent lamp sources. Alternatively, a plurality of window comparators 28 and coincidence circuits 29 may be used so that a plurality of ranges of voltages corresponding to a plurality of ranges of color temperatures may be detected, thus allowing a simultaneous correction for an offset in the white balance control for a plurality of fluorescent lamp sources.

When the ripple detector circuit 21 detects the ripple component $R_A$ associated with a fluorescent lamp source and the comparator 24 produces an output of "1", this output is fed to the filter control circuit 26 as before, thus driving the color temperature conversion filter 25 interposed between the optical lens 2 and the camera element 3 out of the taking light path. This contributes to achieving an improved white balance control and an offset correction by the adjusting circuit 7. As a further alternative, instead of automatically moving the conversion filter 25 out of the taking light path, a warning may be produced in response to an output from the comparator 24, thus notifying a user to remove the conversion filter 25 manually.

In the embodiments described above, two colors R and B of the three primary colors have been detected to control the level of the R and B signals in order to achieve a white balance, but all the three primary colors may be detected to control the level of the three color signals R, G and B without departing from the scope and spirit of the invention.

What is claimed is:

1. A white balance control system, comprising:
   color temperature detecting means for detecting a color temperature of light received thereby from the direction of an object to be imaged and for generating a first output signal as a function thereof, said output signal including a ripple component when said received light flickers, said ripple component being indicative of the magnitude and frequency of the flickering of said received light;
   ripple detecting means for detecting said ripple component of said first output signal and for generating a second output signal as a function thereof; and
   white balance control means for controlling the gain of respective color control amplifiers as a function of both said first and second output signals.

2. A white balance control system in accordance with claim 1, wherein said ripple detecting means comprises:
   a bandpass amplifier to pass a band of frequencies of said ripple component;
   a detecting circuit for detecting an output signal of said bandpass amplifier; and
   a comparator for comparing the level of an output signal of said detecting circuit with a predetermined reference signal level for issuing said second output signal as a function of said comparison.

3. A white balance control system in accordance with claim 1, further including an alarm means for issuing an alarm signal when a light balancing filter must be removed from an optical path of an incident light to an image pick-up device of said system as a function of said second output signal.

4. A white balance control system in accordance with claim 3, wherein said ripple detecting means comprises:
   a bandpass amplifier to pass a band of frequencies of said ripple component;
   a detecting circuit for detecting an output signal of said bandpass amplifier; and
   a comparator for comparing the level of a DC output signal of said detecting circuit with a predetermined reference signal level and for issuing said second output signal as a function of said comparison.

5. A white balance control system in accordance with claim 1, further including driving means for driving a light balancing filter inserted in an optical path of an incident light to an image pick-up device of said system so as to remove said filter from said optical path as a function of said second output signal.

6. A white balance control system in accordance with claim 5, wherein said ripple detecting means comprises:
   a bandpass amplifier to pass a band of frequencies of said ripple component;
   a detecting circuit for detecting an output signal of said bandpass amplifier; and a comparator for comparing the level of a DC output signal of said detecting circuit with a predetermined reference signal level and for issuing said second output signal as a function of said comparison.

7. A white balance control system according to claim 1, wherein the magnitude of said ripple component is indicative of whether said received light is an incandescent or fluorescent light and wherein said ripple detecting means causes said second signal to switch between a first and a second signal level as a function of whether or not said received light is fluorescent light.

8. A white balance control system according to claim 7, further including color temperature discriminating means responsive to said first output signal for generating a third output signal whenever the temperature of said received light falls within a predetermined range and further including gating means for applying said second output signal to said white balance controlling means only when said received light falls within said predetermined color temperature range.

9. A white balance control system, comprising:
color temperature detecting means for detecting a color temperature of light received thereby from the direction of an object to be imaged and for generating a first output signal as a function thereof, said output signal including a ripple component when said received light flickers, said ripple component being indicative of the magnitude and frequency of the flickering of said received light;
ripple detecting means for detecting said ripple component of said first output signal and for generating a second output signal as a function thereof;
color temperature discriminating means responsive to said first output signal for determining when said received light has a predetermined color temperature and for generating a third output signal as a function thereof; and
white balance controlling means for controlling the gain of respective color signal amplifiers of said system as a function of said first, second and third output signals.

10. A white balance control system in accordance with claim 9, wherein said ripple detecting means comprises:
a bandpass amplifier to pass a band of frequencies of said ripple component;
a detecting circuit for detecting an output signal of said bandpass amplifier; and
a comparator for comparing the level of a DC output signal of said detecting circuit with a predetermined reference signal level and for issuing said second output signal as a function of said comparison.

11. A white balance control system according to claim 9, further including alarm means responsive to said second output signal for generating an alarm signal indicating that a color balancing filter should be removed from an optical path of incident light to an image pick-up device of said system.

12. A white balance control system in accordance with claim 11, wherein said ripple detecting means comprises:
a bandpass amplifier to pass a band of frequencies of said ripple component;
a detecting circuit for detecting an output signal of said bandpass amplifier; and
a comparator for comparing the level of a DC output signal of said detecting circuit with a predetermined reference signal level and for issuing said second output signal as a function of said comparison.

13. A white balance control system according to claim 9, further including filter driving means for removing a light balancing filter located in an optical path of an incident light to an image pick-up device of said system from said optical path as a function of said second output signal.

14. A white balance control system in accordance with claim 7, wherein said ripple detecting means comprises:
a bandpass amplifier to pass a band of frequencies of said ripple component;
a detecting circuit for detecting an output signal of said bandpass amplifier; and
a comparator for comparing the level of a DC output signal of said detecting circuit with a predetermined reference signal level and for issuing said second output signal as a function of said comparison.

* * * * *